(12) United States Patent
Johansson (10) Patent No.: US 10,714,952 B2
(45) Date of Patent: Jul. 14, 2020

(54) CHARGING APPARATUS AND CHARGING NETWORK HAVING SUCH CHARGING APPARATUSES

(71) Applicant: Roland Johansson, Vittsjö (SE)

(72) Inventor: Roland Johansson, Vittsjö (SE)

(73) Assignee: Nuculus AS, Kleppe (NO)

( * ) Notice: Subject to any disclaimer, the term of this patent is extended or adjusted under 35 U.S.C. 154(b) by 1 day.

(21) Appl. No.: 15/758,929

(22) PCT Filed: Sep. 7, 2016

(86) PCT No.: PCT/SE2016/050840
§ 371 (c)(1),
(2) Date: Mar. 9, 2018

(87) PCT Pub. No.: WO2017/044037
PCT Pub. Date: Mar. 16, 2017

(65) Prior Publication Data
US 2019/0044352 A1 Feb. 7, 2019

(30) Foreign Application Priority Data

Sep. 11, 2015 (SE) ...................... 1530136

(51) Int. Cl.
*H02J 7/00* (2006.01)
*B60L 53/31* (2019.01)
(Continued)

(52) U.S. Cl.
CPC ............ *H02J 7/0042* (2013.01); *B60L 53/31* (2019.02); *G06K 7/10366* (2013.01); *G06Q 20/4014* (2013.01); *H02J 7/0027* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
CPC ...................................... H02J 7/0042
USPC ........................................ 320/109
See application file for complete search history.

(56) References Cited

U.S. PATENT DOCUMENTS

2011/0140657 A1  6/2011  Genzel et al.
2011/0145141 A1  6/2011  Blain
(Continued)

FOREIGN PATENT DOCUMENTS

DE   102012022963    *   5/2014   ............... B60S 5/00
DE   102012022963 A1    5/2014

OTHER PUBLICATIONS

International Search Report, Application No. PCT/SE2016/050840, dated Nov. 28, 2016, 2 pages.

*Primary Examiner* — Edward Tso
*Assistant Examiner* — Ahmed H Omar
(74) *Attorney, Agent, or Firm* — Ziegler IP Law Group LLC (57) ABSTRACT

A charging apparatus operable to provide different charging outputs. The charging apparatus includes an adapter (100) configured to receive a power supply cable (202). The charging apparatus also includes at least one charging module (300) associated with a specific charging output. One of the at least one charging module (300) is operatively and detachably coupled to the adapter. Further, the adapter is configured to be replaceably coupled to other charging modules of the at least one charging module having different charging outputs.

13 Claims, 4 Drawing Sheets

(51) Int. Cl.
   *G06K 7/10* (2006.01)
   *G06Q 20/40* (2012.01)

(56) References Cited

U.S. PATENT DOCUMENTS

2011/0246014 A1* 10/2011 Sauper ................ B60L 53/305
                                                701/22
2013/0320921 A1   12/2013 Muller et al.
2014/0145676 A1    5/2014 Venkataraman et al.

* cited by examiner

CHARGING APPARATUS AND CHARGING NETWORK HAVING SUCH CHARGING APPARATUSES

TECHNICAL FIELD

The present disclosure relates generally to a charging apparatus; and more specifically, to a charging apparatus operable to provide different charging outputs.

BACKGROUND

The proliferation of battery-powered devices continues to expand as technology increases. One such example includes use of batteries in electric vehicles, such as electrical cars, bikes, cycles, segways and the like. Generally, such batteries are rechargeable in nature and need to be recharged based on the usage thereof. Typically, charging stations may be used for charging such batteries of the electric vehicles.

The charging stations are generally open spaces having number of charging units (or charging stands) installed therein. Therefore, the job of setting up a charging station is very expensive and time consuming task. To address such problem, the use of charging apparatuses, which can be mounted on electrical structures, such as lamp post, are known in the art. Specifically, such charging apparatuses are electrically coupled to a power supply cable (carried by the lamp post) to provide the required electrical charging power.

In a United States patent application US20110246014, there is described a modular charging station system for conductive charging of the batteries of electric vehicles. The modular charging station system includes a base unit, a master module, and a user module. The base unit is configured without electronics and has at least one clamping device for the power feed and compartments for accommodating the master module and the user module. The master module and the user module form a high-current transmission device, with the master module having a socket and the user module having a plug that corresponds to the socket of the master module.

In another United States patent application US20110140657, there is described a method and system to deploy electrical charge spots in stages according to demand. During a first stage a plurality of infrastructure adapters are installed, which may involve demolishing and rebuilding portions of the infrastructure and laying down power cables from the electrical power supply to the charge spot locations. The infrastructure adapters are then coupled to an electrical power supply. Further, if not all, many of the infrastructure adapters are covered with a temporary housing protecting them from vandalism and weather. During a second stage, in response to a demand for charge stations, the charge stations are completed. During the second stage, at least one external unit is attached to an infrastructure adapter by making an infrastructure adapter quick connect interface with an external unit quick connect interface.

Typically, such charging apparatuses may be associated with specific charging outputs, for example 16 Ampere (A), 32 A, 63 A or 120 A. Therefore, once such charging apparatuses are mounted or installed on the electrical structures, such electrical structures (or charging point) are configured to provide charging outputs corresponding to the charging apparatuses installed thereon. For example, a charging apparatus installed in a particular lamp post may provide 32 A of charging output, similarly another charging apparatus installed in another lamp post may provide 63 A of charging output. Therefore, it may not be possible to obtain different charging outputs from a same charging point (particularly, from the same electrical structure or the same charging apparatus). Accordingly, to obtain increased or decreased charging output re-installation of the whole charging apparatus needs to be performed on the electrical structure, which is again an expensive and a time-consuming task.

Therefore, in light of the foregoing discussion, there exists a need to overcome the aforementioned drawbacks of conventional charging apparatuses.

SUMMARY

The present disclosure seeks to provide a charging apparatus.

The present disclosure further seeks to provide a charging network.

In one aspect, an embodiment of the present disclosure provides a charging apparatus comprising:
an adapter configured to receive a power supply cable, the adapter comprising
a housing,
a duct configured on the housing for receiving the power supply cable therethrough,
a connector coupled to the power supply cable, and
a plurality of locking tabs arranged on the housing; and
at least one charging module associated with a specific charging output, wherein one of the at least one charging module is operatively and detachably coupled to the adapter, each of the at least one charging module comprising
a plug contact configured to be engaged with the connector of the adapter,
a plurality of recesses for receiving the plurality of locking tabs for detachably coupling the one of at least one charging module with the adapter, and
a plug holder configured to be engaged to a cord and plug assembly of a charging device for being charged with a charging output corresponding to the one of at least one charging module;
wherein the adapter is configured to be replaceably coupled to other charging modules of the at least one charging module having different charging outputs.

In another aspect, an embodiment of the present disclosure provides a charging network comprising:
a transformer station;
a plurality of power supply cables originating from the transformer station; and
a plurality of charging apparatus, electrically coupled to the plurality of power supply cables, each of the plurality of charging apparatus comprising
an adapter configured to receive a power supply cable, the adapter comprising
a housing,
a duct configured on the housing for receiving the power supply cable therethrough,
a connector coupled to the power supply cable, and
a plurality of locking tabs arranged on the housing; and
at least one charging module associated with a specific charging output, wherein one of the at least one charging module operatively and detachably coupled to the adapter, each of the at one charging module comprising
a plug contact configured to be engaged with the connector of the adapter,
a plurality of recesses for receiving the plurality of locking tabs for detachably coupling the one of at least one charging module with the adapter, and a plug holder configured to be engaged to a cord and plug assembly of a charging device for being charged with a charging output corresponding to the one of at least one charging module;

wherein the adapter is configured to be replaceably coupled to other charging modules of the at least one charging module having different charging outputs.

Embodiments of the present disclosure substantially eliminate or at least partially address the aforementioned problems in the prior art, and enables in providing a charging apparatus operable to provide different charging outputs.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a charging apparatus comprising:

an adapter configured to receive a power supply cable, the adapter comprising a housing, a duct configured on the housing for receiving the power supply cable therethrough, a connector coupled to the power supply cable, and a plurality of locking tabs arranged on the housing; and at least one charging module associated with a specific charging output, wherein one of the at least one charging module is operatively and detachably coupled to the adapter, each of the at least one charging module comprising a plug contact configured to be engaged with the connector of the adapter, a plurality of recesses for receiving the plurality of locking tabs for detachably coupling the one of at least one charging module with the adapter, and a plug holder configured to be engaged to a cord and plug assembly of a charging device for being charged with a charging output corresponding to the one of at least one charging module;

wherein the adapter is configured to be replaceably coupled to other charging modules of the at least one charging module having different charging outputs.

In another aspect, an embodiment of the present disclosure provides a charging network comprising:

a transformer station;

a plurality of power supply cables originating from the transformer station; and a plurality of charging apparatus, electrically coupled to the plurality of power supply cables, each of the plurality of charging apparatus comprising an adapter configured to receive a power supply cable, the adapter comprising a housing, a duct configured on the housing for receiving the power supply cable therethrough, a connector coupled to the power supply cable, and a plurality of locking tabs arranged on the housing; and at least one charging module associated with a specific charging output, wherein one of the at least one charging module operatively and detachably coupled to the adapter, each of the at one charging module comprising a plug contact configured to be engaged with the connector of the adapter, a plurality of recesses for receiving the plurality of locking tabs for detachably coupling the one of at least one charging module with the adapter, and a plug holder configured to be engaged to a cord and plug assembly of a charging device for being charged with a charging output corresponding to the one of at least one charging module;

wherein the adapter is configured to be replaceably coupled to other charging modules of the at least one charging module having different charging outputs.

According to an embodiment, the present disclosure provides a charging apparatus which may be operable to provide different charging outputs. The term "charging output" used herein may be associated with amperage that may be provided by the charging apparatus. For example, the charging apparatus may be operable to provide different charging outputs, such as 16 A, 32 A, 63 A and 120 A, for charging different charging devices requiring different charging outputs.

According to an embodiment, the charging devices relate to any type of device that is movable and could be powered by a power supply network. For example, the charging devices may include electrical vehicle, such as electrical cars, bikes, cycles, segways and the like. Typically, the charging device may be a car equipped with an electrically powered engine, pre-heater or car heater. Alternatively, the charging devices may include portable electronic gadgets. For example, the charging devices may include mobile phones, laptops and the like.

The charging apparatus of the present disclosure is configured to use a power supply cable for charging the charging devices. The power supply cable may be associated with a power station. Specifically, the power supply cable may be associated with cables originating from a transformer station connected to the power station (with transmission cables). The power supply cable originates from the transformer station for distributing power to various power consuming sources, such as residential and commercial building, steers, airport, dock, railway station and the like. In one embodiment, splitter boxes may be used in between the transformer station and the power consuming sources for power distribution and regulation (based on need and availability).

In an embodiment, the power supply cable may include a cross-section of about 25 mm$^2$. Further, the power supply cable may carry current of 120 A or more.

According to an embodiment, the charging apparatus may be operable to be used in conjunction with electrical structures, of a power consuming source, carrying the power supply cable. Specifically, the charging apparatus may be mounted on such electrical structures (carrying the power supply cable) for getting access to the power supply cable. In an example, the electrical structures may include a lamp post or a street electrical enclosure carrying the power supply cable.

As mentioned above, the adapter of the charging apparatus is configured to receive the power supply cable. Specifically, the adapter comprises a housing and a duct configured on the housing for receiving the power supply cable therethrough. In an embodiment, the housing may be configured to have a cuboidal structure. Alternatively, the housing may be configured to have a cylindrical structure. In the present embodiment, the housing may be a rectangular box like structure having top and bottom walls, front and rear walls and side walls. In one embodiment, the front wall of the housing may be detachable, whereas the remaining walls may be integral to form a single structure.

In an embodiment, the duct of the adapter may be configured on the bottom wall of the housing. For example, the duct may be configured by a hollow cylindrical structure having an opening for receiving the power supply cable therethrough. In an example, the hollow cylindrical structure may be a bolt or a bush arranged on the bottom wall of the housing.

According to an embodiment, the adapter further includes a connector coupled to the power supply cable. In an example, the adapter comprises a first connector adapted to be connected to the power supply cable and a second connector adapted to be connected (engaged electrically) with a charging module of the charging apparatus, which is explained in greater detail herein later. Specifically, the first connector may be arranged inside the housing and connected to an end of the power supply cable, whereas the second connector may be arranged on (or extending from) the top wall of the housing and electrically coupled to the first connector. Further, as mentioned above, the front wall of the housing may be detachable. This allows the power supply cable to be suitably connected to the first and second connectors.

In one embodiment, the apparatus further comprises a plurality of locking tabs arranged on the housing. In an example, the locking tabs are arranged on both side walls of the housing. For example, the locking tabs may be bolts (or similar structure) extending from the both side walls of the housing. Further, each side wall may be carrying multiple locking tabs, such as 2 or 3 or 5 locking tabs.

In one embodiment, the rear wall of the housing includes a plurality of mounting holes configured thereon. The each of the plurality of mounting holes may enable in mounting the housing of the adapter to the electrical structures, such as the lamp post or the street electrical enclosure carrying the power supply cable. For example, the mounting holes may be configured to receive tying means, such as wires, ropes and brackets, therethrough for mounting the housing onto the electrical structures. Further, in one embodiment, the rear wall of the housing may be configured to have a shape, such as concave or flat, such that the rear wall of the housing conforms to a shape of the electrical structures for being suitably mounted thereon. In an example, the rear wall of the housing may be configured to have a concave shape such that the housing may be suitably mounted on cylindrical lamp post.

In an embodiment, the adapter may also include a closable lid arranged on the housing of the adapter. For example, the closable lid may be arranged on the top wall of the housing, such that the closable lid can cover the connector (particularly, the second connector) arranged on the top wall. The closable lid may be used for covering and protecting the connector of the adapter when only adapter is mounted on an electrical structure (without a charging module).

As mentioned above, the charging apparatus comprises at least one charging module associated with a specific charging output. The term "charging output" used herein may be associated with amperage of the charging module. Therefore, one or more charging modules constituting the at least one charging module of the charging apparatus may include various charging output. In an example, the one or more charging modules may include charging output, such as 16 A, 32 A, 63 A, 120 A and the like.

The one of the at least one charging module is operatively and detachably coupled to the adapter. Specifically, one charging module at a time is adapted to be operatively and detachably coupled to the adapter. Further, that charging module may be associated with a charging output, such as 16 A, 32 A, 63 A, 120 A and the like.

The each of the at least one charging module comprises a plug contact configured to be engaged with the connector of the adapter. According to an embodiment, the plug contact of the charging module may configured to be a male connector construction, whereas the connector of the adapter may configured to be a female connector construction to operatively engage with the plug contact. In an embodiment, the plug contact is a toothed unit that enable the plug contact to get engaged into small openings of the connector.

In one embodiment, the each of the at least one charging module comprises a plurality of recesses for receiving the plurality of locking tabs for detachably coupling the one of the at least one charging module with the adapter. Specifically, the housing of the adapter is detachably coupled to the charging module. In an embodiment, the charging module comprises a cavity adapted to be at least partially receive the housing of the adapter therein. Further, on two sides of that cavity two planer structures are arranged. Each of the two planer structures comprises the recesses for receiving the plurality of locking tabs. Therefore, the housing of the adapter is received in the cavity of the charging module, such that initially the plug contact of the charging module engages with the connector of the adapter. Thereafter, the locking tabs may be received by the recesses. In an example, the recesses are configured to have L-shape and correspond to the number of the locking tabs. The recesses and locking tabs arrangement provides the detachable mechanical coupling between the charging module and the adapter.

In an embodiment, the each of the at least one charging module comprises a plug holder. The plug holder may be configured to be engaged to a cord and plug assembly of a charging device for being charged with a charging output corresponding to the one of at least one charging module. The plug holder may include different structural configurations corresponding to the charging outputs thereof. Accordingly, different charging devices (such as different electrical vehicles) may include different cord and plug assemblies corresponding to required different charging outputs.

In use, the adapter of the present disclosure may be configured to be replaceably coupled to other charging modules of the at least one charging module having different charging outputs. This allows the same adapter to be operable in conjunction with charging modules of different charging outputs. This in turn provides a flexibility to simply change the charging module to yield different charging output rather replacing the entire charging apparatus for yielding different charging output.

In an embodiment, the charging apparatus of the present disclosure may be used for charging the portable electronic gadgets, such as mobile phones, laptops, music players and the like. For example, the charging module may be configured to include one or more additional plug holder or electrical outlets electrically compatible for charging such electronic gadgets. In an example, the charging module may include slidable covers arranged on sides of the charging module. The slidable covers are configured to the cover the additional plug holder or electrical outlets for the portable electronic gadgets.

According to an embodiment, the charging apparatus further comprises an identification tag carried by the each of the at least one charging module, and a tag reader carried by the adapter for reading the identification tag for identifying the charging output of the each of the at least one charging module. In an example, the identification tag is RFID (Radio Frequency Identification) and the tag reader is a RFID tag reader. Alternatively, other tags like NFC (Near Field Communication) tag and tag readers like NFC tag reader can also be used. The RFID arrangement of the charging apparatus makes the charging apparatus an intelligent apparatus. Specifically, the identification tag carries information, for the adapter, i.e. how much power should be delivered to the charging module. This allows a charging module having 32 A charging output to receive 32 A or less, and essentially not more than 32 A. Further, if the tag reader fails to identify the information of the identification tag, then no power will be delivered from the adapter to the charging module.

In an embodiment, the charging module further comprises a controller. The controller may be operable to control power input from a power supply cable to the charging module.

In an embodiment, the charging module further comprises a communication module. The communication module may be configured to communicate data pertaining to the charging module in a communication network, such as communication networks GSM, 3G or 4G. In an example, the communication module may be configured to communicate with an intelligent unit or a cloud based central (described herein later), which may control the charging modules of the charging apparatuses present in the charging network.

In another embodiment, the power to the charging module may be controlled by the intelligent unit present in the charging network (or power distribution grid). The intelligent unit may include a processor, a memory means and a connection to the charging network (for example to the transformer station of the charging network). The memory means may be set up for storing rules for controlling a group of the charging modules. The processor may be set up for receiving data originating from a specific charging module of the group from the communication module and, in some embodiments forward this data to the cloud based central. The processor is then set up to process this data using input from rules stored in the memory means and, in some embodiments, from the cloud based central connected to the internet. Subsequently, the processor is set up to send instruction data to the charging modules.

Alternatively, the cloud based central may be adapted to control the charging modules and/or the intelligent unit in the charging network (power distribution grid). Similarly, the cloud based central may be a part of the charging network.

According to an embodiment, the charging apparatus may be configured to manage a load in the charging network (power distribution grid). For example, when charging devices (such as electrical vehicles) are connected to respective charging apparatuses, in such instance the information regarding power consumption of the charging devices may be obtained by the intelligent unit (or may be provided to the cloud based central) to manage the load in the charging network. For example, the intelligent unit may instruct the transformer station of the charging network to regulate power in the charging network. For example, in case of overload, the power to the charging devices (i.e. to the charging apparatus) may be lowered.

In an embodiment, the charging module may also include a payment section having means for obtaining payment from a user. The payment section is set up to send data relating to payment to the controller. As disclosed herein, the term "payment section", relates to a section for receiving payment data using the charging apparatus. In some embodiments, this section is comprised of a credit card reader, optionally together with one or more input means. The user inserts his/her credit card in the reader and optionally enters a pin code. The payment section then forwards this data to the controller for proceeding with payment transactions.

In an embodiment, the charging module may also include identification means such as a Bluetooth reading means. The identification means enables a user to be identified (i.e. user identification) by bringing an e-wallet (typically, a mobile phone comprising Bluetooth functionality) close to the reading means. This makes the user not to insert any credit card into the card reader of the payment section. In some embodiments, there may not be such payment section.

In an embodiment, the adapter may be provided with electromechanical locking hooks, which are adapted to engage with corresponding locking means on the charging module. A correct identification, when the charging module has been connected to the adapter will generate a locking activity. Therefore, such locking hooks on the adapter and locking means on the charging module would make the charging apparatus of the present disclosure to be a tamper or theft-proof apparatus.

In an embodiment, the charging module may be provided with a display unit for displaying visual signals. The display unit may be typically some kind of light-emitting arrangement and/or screen for showing text messages. For example, the display unit may provide information related to the charging module (such as its charging output, operating status and the like) and the user (such as user's identification, payment transaction and the like).

The present disclosure provides a charging apparatus having two parts, a first part being an adapter and a second part being a charging module. The charging apparatus of the present disclosure is configured to be easily installed for allowing users to have access to charging power supply. For example, the charging apparatus can be mounted on an existing electrical structure (such as, an existing electric pole) and thus eliminates a need for digging the ground for proving charging power supply. Further, the charging apparatus of the present disclosure is operable to provide different charging outputs. For example, the adapter of the charging apparatus may be configured to be operatively and detachably coupled to various charging modules having different charging outputs. For example, a charging module having a charging output of 32 A may be easily replaced with a charging module having a charging output of 63 A. The adapter is a less expensive component, and thus it is cost efficient to set up the charging apparatus of the present disclosure which may be operable to provide different charging outputs.

DETAILED DESCRIPTION OF THE DRAWINGS

Figure 1:
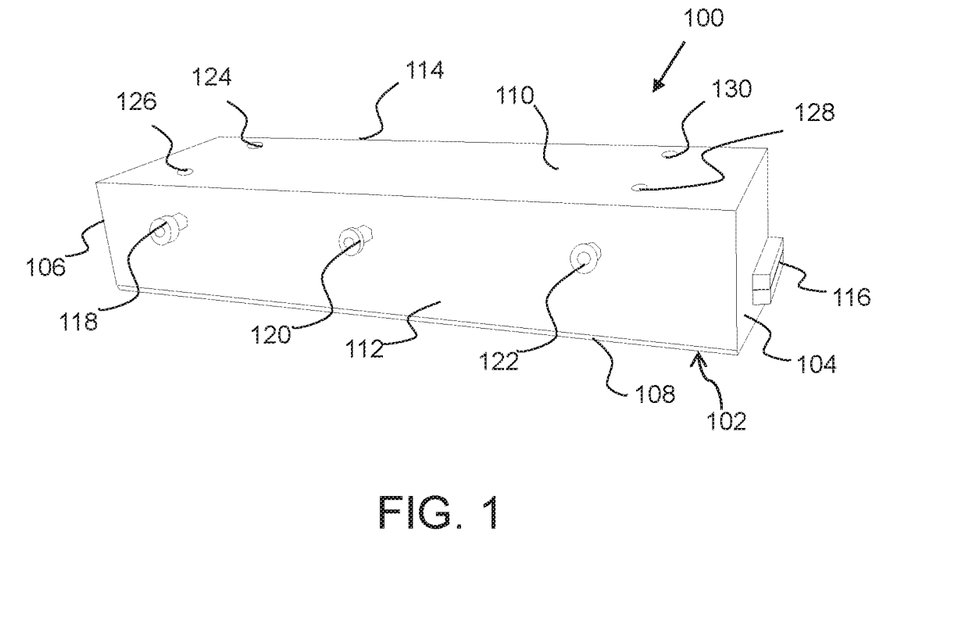
FIGS. 1 and 2 are perspective views of an adapter of a charging apparatus, in accordance with an embodiment of the present disclosure.
Figure 2:
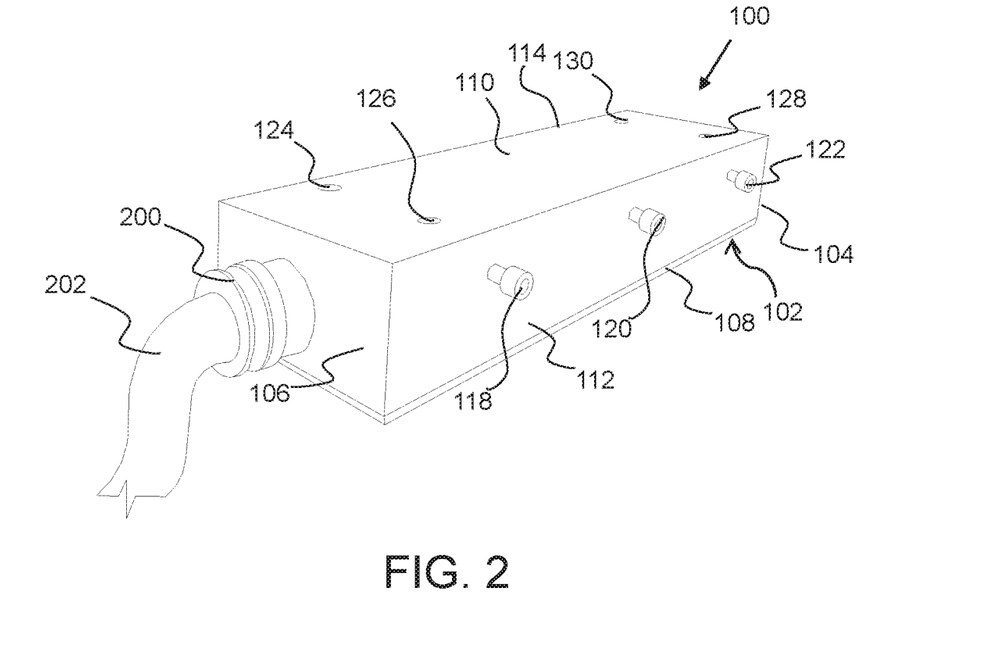

Referring to FIGS. 1 and 2, illustrated are perspective views of an adapter 100, in accordance with an embodiment of the present disclosure. The adapter 100 comprises a housing 102. As shown, the housing 102 is a rectangular box like structure having a top wall 104, a bottom wall 106, a front wall 108, a rear wall 110 and side walls 112, 114. The adapter 100 further includes at least one connector adapted to be coupled to a power supply cable (shown in FIG. 2). For example, the adapter 100 comprises a first connector (not shown) configured inside the housing 102 and a second connector 116 arranged on the top wall 104. The front wall 108 of the housing 102 may be detachable for allowing the power supply cable to be suitably connected to the first connector (not shown) and the second connector 116.

The adapter 100 further comprises a plurality of locking tabs, such as the locking tabs 118, 120 and 122 arranged on the housing 102. As shown, the locking tabs 118, 120, 122 are arranged on the side wall 112 of the housing 102. Similarly, the side wall 114 of the housing 102 may include the locking tabs (not shown) arranged thereon. Further, the rear wall 110 of the housing 102 includes a plurality of mounting holes, such as mounting holes 124, 126, 128 and 130 configured thereon. The mounting holes 124, 126, 128, 130 are configured to receive tying means, such as wires, ropes and brackets (not shown) therethrough for mounting the housing 102 onto an electrical structure, such as a lamp post.

Referring now to FIG. 2, the adapter 100 also comprises a duct 200 configured on the bottom wall 106 of the housing 102. The duct 200 enables in receiving a power supply cable 202 therethrough. The duct 200 provides a water proof connection between the power supply cable 202 and the housing 102.

FIGS. 3 to 6, illustrate perspective views of a charging module 300, in accordance with an embodiment of the present disclosure. The charging module 300 is associated with a specific charging output and is operatively and detachably coupled to the adapter 100. Specifically, the adapter 100 of the FIGS. 1-2 and the charging module 300 of the FIGS. 3-6 together constitutes a charging apparatus of the present disclosure. It is to be understood that, the charging apparatus of the present disclosure includes at least one charging module (for example one or more charging module, such as charging module 300) adapted to be operatively and detachably coupled to the adapter 100. Further, the adapter 100 is configured to be replaceably coupled to other charging modules (of the one or more charging modules) having different charging outputs.

Figure 3:
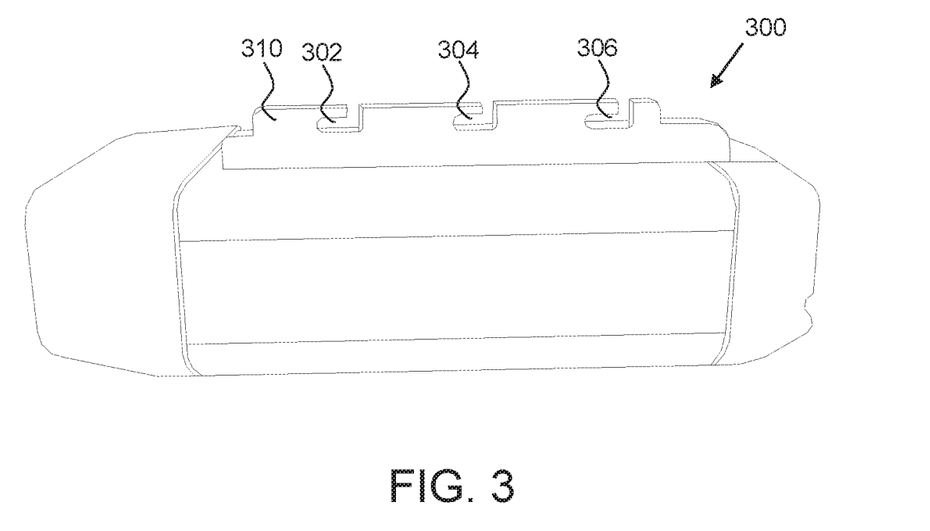
FIGS. 3 to 6 are perspective views of a charging module of the charging apparatus, in accordance with an embodiment of the present disclosure.

As shown in FIG. 3, the charging module 300 comprises a plurality of recesses, such as recesses 302, 304 and 306 for receiving the plurality of locking tabs 118, 120, 122 (shown in FIGS. 1 and 2) for detachably coupling the charging module 300 with the adapter 100. Specifically, as shown, the charging module 300 comprises two planer structures, such as a planer structure 310 (and other being not visible), having the recesses 302, 304, 306 configured thereon. The recesses 302, 304, 306 are configured to have L-shape, and correspond to the number of the locking tabs 118, 120, 122. The arrangement of the recesses 302, 304, 306 (on the charging module 300), and the locking tabs 118, 120 and 122 (on the adapter 100) provides the detachable mechanical coupling between the charging module 300 and the adapter 100. For example, when the adapter 100 is mounted on the electrical structure, such as the lamp post, other charging modules (having different charging outputs) may be replaceably coupled to the adapter 100.

Figure 4:
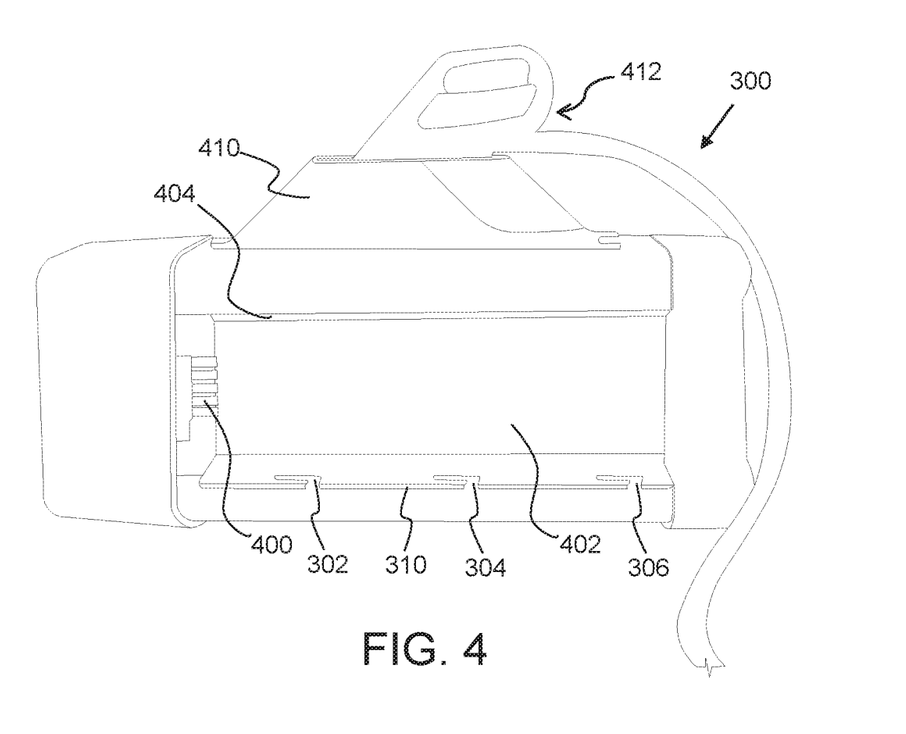

Referring now to FIG. 4, the charging module 300 also comprises a plug contact 400 configured to be engaged with the connector 116 (particularly the second connector) of the adapter 100. As shown, the charging module 300 comprises a cavity 402 adapted to at least partially receive the housing 102 of the adapter 100 (shown in FIGS. 1-2). Further, on two sides of the cavity 402, two planer structures 310 (also shown in FIG. 3) and 404 are arranged. Each of the two planer structures 310, 404 comprises the recesses, such as the recesses 302, 304, 306, for receiving the plurality of locking tabs, such as the locking tabs 118, 120 and 122 (shown in FIG. 1-2) of the adapter 100. Therefore, the housing 102 of the adapter 100 is received in the cavity 402 of the charging module 300, such that initially the plug contact 400 of the charging module 300 engages with the connector 116 of the adapter 100. In the process, the locking tabs 118, 120, 122 are received by the recesses 302, 304, 306, respectively, for enabling operative and detachable coupling between the adapter 100 and the charging module 300.

The charging module 300 further comprises a plug holder 410. The plug holder 410 is configured to be engaged to a cord and plug assembly 412 of a charging device (such as, an electrical vehicle, not shown) for being charged with a charging output corresponding to the charging module 300.

Figure 5:
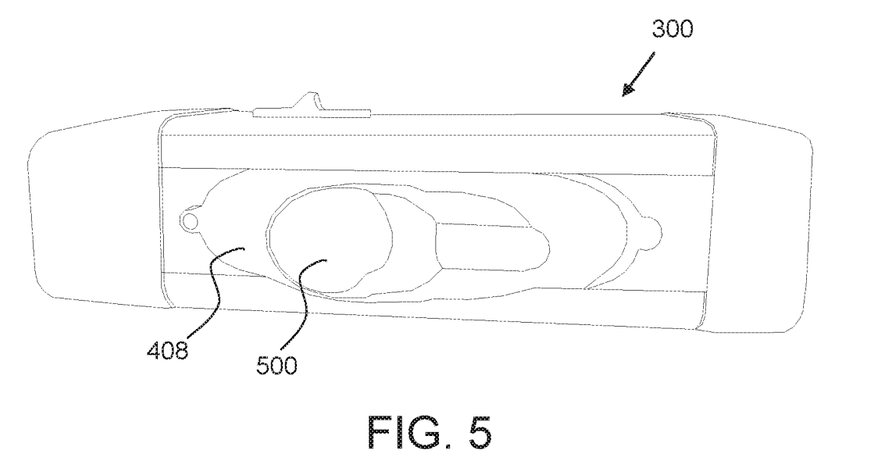

Referring now to FIG. 5, illustrated is the charging module 300 with the plug holder 408. As shown, the plug holder 408 comprises an opening 500 for receiving the cord and plug assembly 410 (shown in FIG. 4). Further, the cavity 500 may be configured to have various configurations to accommodate various cord and plug assemblies (adapted to operate on various charging outputs) associated with various charging devices.

Figure 6:
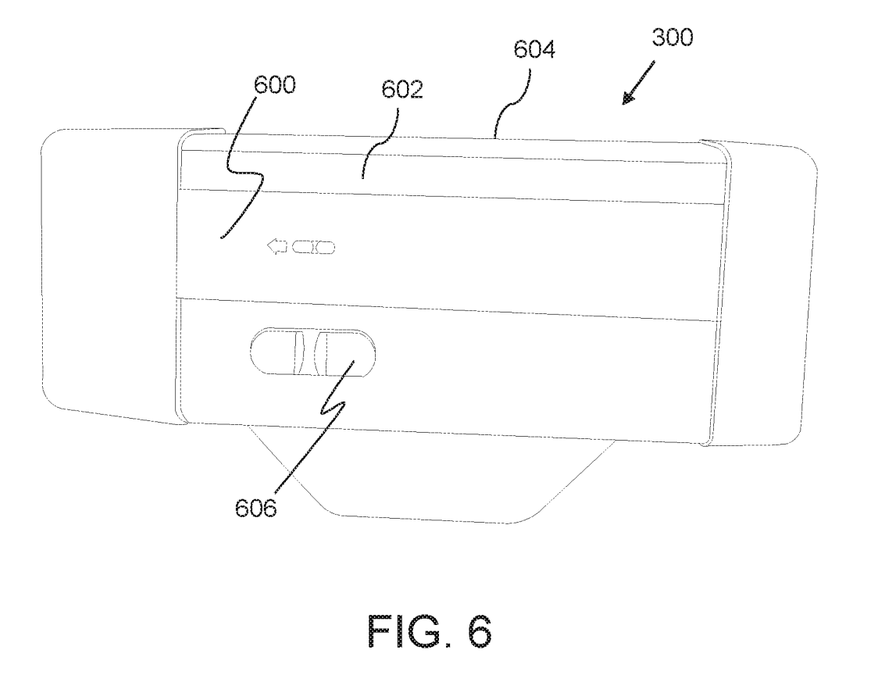

Referring now to FIG. 6, illustrated is the charging module 300 having a slidable cover 600 arranged on a side 602 of the charging module 300. Similarly, the charging module 300 may also include another slidable cover arranged on other side 604 of the charging module 300. The slidable covers, such as the slidable cover 600, are configured to cover additional plug holders or electrical outlets, which may be suitable for being used in conjunction with portable electronic gadgets, such as laptop, mobile phones and the like. As shown, the charging module 300 also includes locking tabs, such as a locking tab 606, for slidably moving the slidable covers, such as the slidable cover 600.

Figure 7:
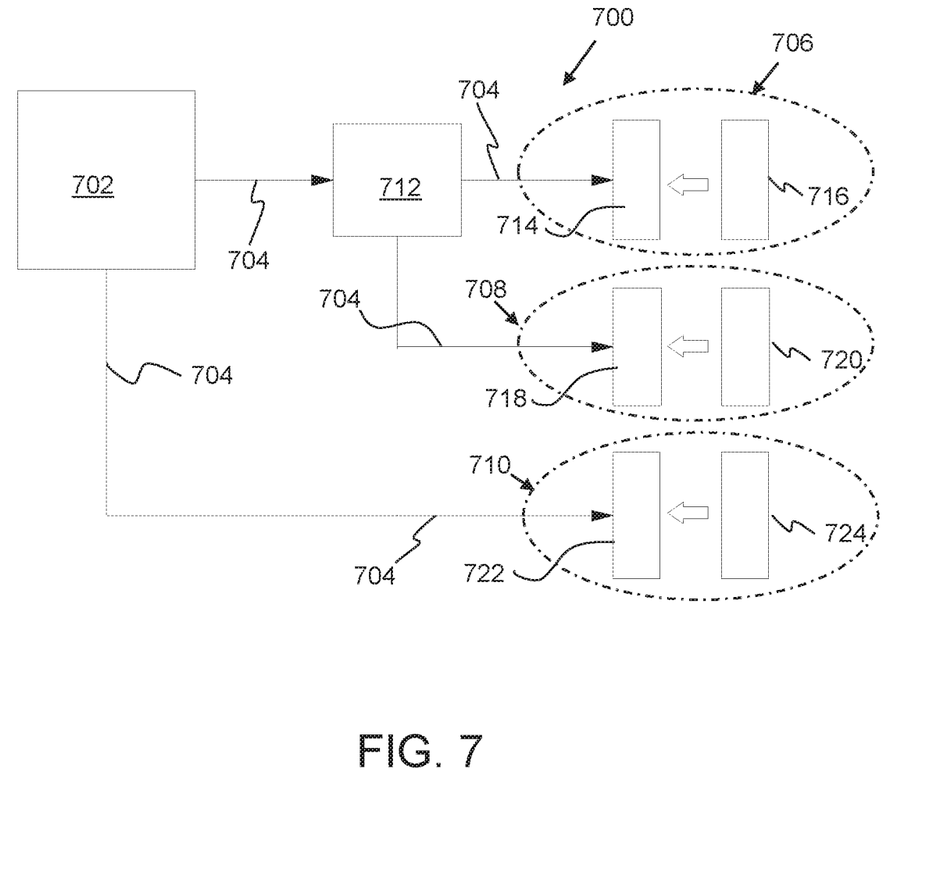
FIG. 7 is a block diagram depicting a charging network having a plurality of charging apparatuses, in accordance with an embodiment of the present disclosure.

Referring to FIG. 7, illustrated is a block diagram depicting a charging network 700, in accordance with an embodiment of the present disclosure. The charging network 700 comprises a transformer station 702, a plurality of power supply cables, such as the power supply cables 704, originating from the transformer station 702. The charging network 700 also comprises a plurality of charging apparatus, such as charging apparatus 706, 708 and 710, electrically coupled to the plurality of power supply cables, such as the power supply cables 704.

As shown, few of the power supply cables 704 is configured to connect the transformer station 702 directly to charging apparatuses, such as the charging apparatus 710. Otherwise, the power supply cables 704 may be configured to connect the transformer station 702 indirectly to charging apparatuses, such as the charging apparatuses 706, 708, or via a splitter box 712. Therefore, the power supply cables 704 enable in distributing power from the transformer station 702 to the charging apparatus 706, 708, 710. Further, the splitter box 712 also enables in distributing the power from the transformer station 702 to the charging apparatus 706, 708. In an embodiment, the splitter box 712 may also enable in regulating power (based on need and availability of power in the charging network 700).

As shown, each of the charging apparatuses 706, 708 and 710 comprises an adapter and a charging module. As shown, the charging apparatus 706 comprises an adapter 714 and a charging module 716, similarly the charging apparatus 708 comprises an adapter 718 and a charging module 720 and the charging apparatus 710 comprises an adapter 722 and a charging module 724. The adapters 714, 718, 722 of the charging apparatuses 706, 708, 710 may be mounted on electrical structures, such as a lamp post (not shown). Further, the charging modules 716, 720, 724 may be operatively and detachably coupled to the adapters 714, 718, 722, respectively. Moreover, the charging modules 716, 720, 724 may be replaceably coupled to the adapters 714, 718, 722. This enables the charging apparatuses 706, 708, 710 of the present disclosure to be operable to provide different charging outputs corresponding to the different charging modules 716, 720, 724.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A charging apparatus comprising:
an adapter configured to receive a power supply cable; the adapter comprising
a housing,
a duct configured on the housing for receiving the power supply cable therethrough,
a connector coupled to the power supply cable, and
a plurality of locking tabs arranged on the housing; and
at least one charging module associated with a specific charging output, wherein one of the at least one charging module is operatively and detachably coupled to the adapter, each of the at least one charging module comprising
a plug contact configured to be engaged with the connector of the adapter,
a plurality of recesses for receiving the plurality of locking tabs for detachably coupling the one of at least one charging module with the adapter, and
a plug holder configured to be engaged to a cord and plug assembly of a charging device for being charged with a charging output corresponding to the one of at least one charging module;
wherein the adapter is configured to be replaceably coupled to other charging modules of the at least one charging module having different charging outputs.

2. The charging apparatus according to claim 1, wherein the housing of the adapter is configured to be mounted on a structure, carrying the power supply cable, including but not limited to a lamp post and a street electrical enclosure.

3. The charging apparatus according to claim 1, wherein the housing is a rectangular box having top and bottom walls, front and rear walls and side walls, the front wall of the housing is detachable and the remaining walls may be integral to form a single structure.

4. The charging apparatus according to claim 1, wherein
the duct is configured on the bottom wall of the housing,
the connector is arranged on the top wall of the housing, and
the plurality of locking tabs are arranged on the side walls of the housing.

5. The charging apparatus according to claim 1, wherein the rear wall of the housing includes a plurality of mounting holes that enable in mounting the housing of the adapter to the electrical structures.

6. The charging apparatus according to claim 1, wherein the adapted further includes a closable lid arranged on the top wall of the housing to cover the connector.

7. The charging apparatus according to claim 1, wherein the charging module is configured to include one or more additional plug holder electrically compatible for portable electronic gadgets.

8. The charging apparatus according to claim 1, wherein the charging module further comprises:
a controller, the controller is operable to control power input from the power supply cable to the charging module,
a communication module, the communication module is configured to communicate data pertaining to the charging module in a communication network,
a payment section having means for obtaining payment from a user, and
identification means for user identification.

9. The charging apparatus according to claim 1, further comprising
an identification tag carried by the each of the at least one charging module, and
a tag reader carried by the adapter for reading the identification tag for identifying the charging output of the each of the at least one charging module.

10. A charging network comprising:
a transformer station;
a plurality of power supply cables originating from the transformer station; and
a plurality of charging apparatus, electrically coupled to the plurality of power supply cables.

11. The charging network according to claim 10, further comprising an intelligent unit for controlling the charging modules of the charging apparatuses present in the charging network, wherein the intelligent unit comprise a processor, a memory means and a connection to the charging network.

12. The charging network according to claim 1, wherein a charging apparatus of the plurality of charging apparatus comprises:
- an adapter configured to receive a power supply cable, wherein the adapter comprises
  - a housing;
  - a duct configured on the housing for receiving the power supply cable therethrough;
  - a connector coupled to the power supply cable; and
  - a plurality of locking tabs arranged on the housing; and
- a first charging module configured to provide a first charging output and at least one second charging module configured to provide a second charging output, wherein the second charging output is different from the first charging output;
- wherein the first charging module is configured to be operatively and detachably coupled to the adapter, and the at least one second charging module is configured to be operatively and detachably coupled to the adapter;
- wherein the first charging module at the at least one second charging module comprise
- a plug contact configured to be engaged with a connector of the adapter;
- a plurality of recesses in a sidewall of the adapter, the plurality of recesses configured for receiving respective ones of a plurality of locking tabs for detachably coupling the respective one of the first charging module and the at least one second charging module with the adapter; and
- a plug holder configured to be engaged to a cord and plug assembly of a charging device for being charged with a charging output corresponding to the first charging output or the at least one second charging module;
- wherein the adapter is configured to be selectively coupled to the respective one of the first charging module or the at least one second charging module based on a desired different charging output of the first charging module or the at least one second charging module.

13. The apparatus according to claim 1, wherein the at least one charging module comprises a first charging module configured to provide a first charging output and at least one second charging module, the at least one second charging module configured to provide a second charging output that is different from the first charging output.

* * * * *